United States Patent
Honeyman, III

[11] 3,901,965
[45] Aug. 26, 1975

[54] METHOD OF MAKING AN INFLATABLE CATHETER

[76] Inventor: Henry W. Honeyman, III, 161 Harbor Rd., Swansea, Mass. 02777

[22] Filed: Sept. 25, 1973

[21] Appl. No.: 400,558

Related U.S. Application Data

[63] Continuation-in-part of Ser. No. 225,974, Feb. 14, 1972, abandoned.

[52] U.S. Cl. ............... 264/328; 264/275; 264/277; 264/278
[51] Int. Cl. .............................................. B29c 1/06
[58] Field of Search ........... 264/275, 277, 278, 328

[56] References Cited
UNITED STATES PATENTS

| | | | |
|---|---|---|---|
| 3,288,901 | 11/1966 | Clark | 128/349 |
| 3,290,422 | 12/1966 | Michel | 264/328 X |
| 3,308,523 | 3/1967 | Ivester | 264/275 X |
| 3,484,516 | 12/1969 | Simons | 264/275 X |

Primary Examiner—Richard R. Kucia
Attorney, Agent, or Firm—Barlow & Barlow

[57] ABSTRACT

An inflatable catheter having two lumens both supported during molding under pressure. In some cases one of the lumens is formed by a preformed tube of a flexible character and this tube is supported with a core against collapsing, while the other lumen is provided by a non-collapsible form while molding under pressure such as by injection molding of a body portion of the catheter about the supported tube and the form. The body portion of the catheter has a ballooning portion attached to the body through a substrate sleeve which may be attached to the body and to which the ballooning portion is attached.

5 Claims, 18 Drawing Figures

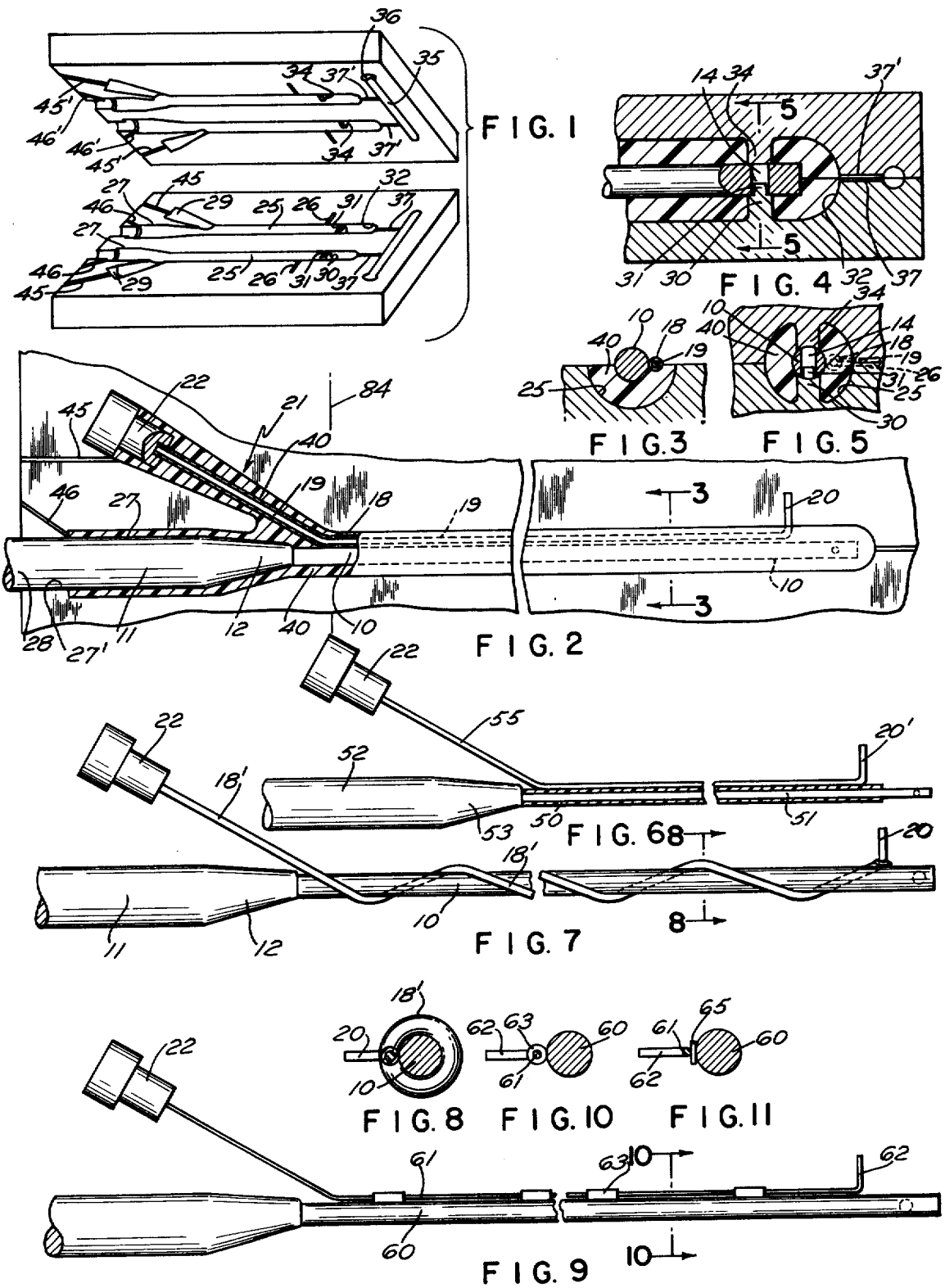

METHOD OF MAKING AN INFLATABLE CATHETER

CROSS REFERENCE TO RELATED APPLICATION

This application is a continuation-in-part of my application Ser. No. 225,974 filed Feb. 14, 1972 and now abandoned.

BACKGROUND OF THE INVENTION

Catheters of this general type have heretofore been formed by dipping as distinguished from molding under pressure, such as injection molding. In some cases a tube has been utilized for the inflation lumen in this dipping method such as shown in U.S. Pat. No. 2,481,488. Dipping the structure used in this patent would be unsuitable where a pressure such as used in injection molding of from 10,000 to 20,000 pounds per square inch are utilized.

SUMMARY OF THE INVENTION

The catheter of this invention is formed by molding under high pressures such as 10,000 to 20,000 pounds per square inch and the providing of a support about which the body material for the catheter is flowed which will not collapse under these high pressures. The means for forming the lumens must be supported in the mold and spaced so that there will be a wall between the two lumens of a sufficient character to withstand the inflation pressures for the ballooning of the sack of the catheter. Conveniently this wall may be provided either by a spacer or by a tube about the supporting core which runs substantially the length of the supporting core, the other lumen being provided about a form also running lengthwise and close to the core. This method carries the forming of the catheter up to the point of providing a sleeve about an opening formed in the inflation lumen which is done after the formation of the body by means of a sleeve of a material which may be adhered to the body and also to which the ballooning material may be adhered.

DESCRIPTION OF THE DRAWINGS

With reference to the drawings

FIG. 1 is a perspective view of the two halves of a mold opened up to show their construction and the cavities in which the catheter is formed;

FIG. 2 is a view on a larger scale showing a fragmental half portion of the mold and the body of the catheter with a form and wire core supported tube and check valve in position and partly in section;

FIG. 3 is a section on line 3—3 of FIG. 2;

FIG. 4 is a fragmental portion of the two halves of the mold in section looking at right angles to the showing in FIG. 2 and illustrating the means of supporting one end of the form for the drainage lumen and the provision of an opening therein;

FIG. 5 is a section on line 5—5 of FIG. 4;

FIG. 6 is a plan view partly in section illustrating a tube for the drainage lumen provided with a form in this tube and illustrating the core for providing the inflation lumen along side of the tube about which the body of the catheter is to be molded and illustrating the check valve in position for the inflation lumen;

FIG. 7 is a view similar to FIG. 2 but illustrating the tube for the inflation lumen as being helically disposed about the drainage form for the drainage lumen;

FIG. 8 is a section on line 8—8 of FIG. 7;

FIG. 9 is a further modified view in which there are two non-collapsible forms for forming the lumens with a tubular part encircling the inflation lumen to space the two forms apart;

FIG. 10 is a section on line 10—10 of FIG. 9;

FIG. 11 is a similar section to FIG. 10 but illustrating the spacing between the two forms as being in linear form or the like instead of in the form of a tube as shown in FIGS. 9 and 10;

DESCRIPTION OF THE INVENTION

Figure 12:
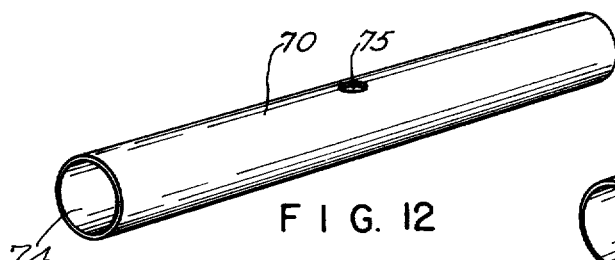
FIG. 12 is a perspective view of the sleeve which is molded.

In FIG. 2 I have illustrated an elongated cylindrical form 10 to provide the drainage lumen which will be of a length substantially the length of the catheter. This form is enlarged at one end as at 11 with a tapered portion 12 joining the cylindrical part 10 and the larger portion 11.

At the opposite end of this form 10 a hole is drilled therethrough as at 14 (see FIG. 4) which receives a support to space the form in the mold cavity and also serves to provide the drainage opening in the molded catheter. This form 10 is solid so as to withstand the pressures of injection molding which ranges from 10,000 to 20,000 pounds per square inch.

In order to provide for the inflation lumen, I utilize a tube of flexible material 18 (see FIG. 3) which extends substantially the length of the catheter and has a supporting wire core 19 extending the full length of the tube which is of a size to substantially fill the opening through the tube. The end of this core beyond the end of the tube is bent as at 20 (see FIG. 2) substantially at right angles to its general longitudinal length and serves as a support for the tube when placed in the recess in the mold leading from the mold cavity in which the tube is located. At the other end of the tube 18, which extends at an angle to form a branch, as seen at the arrow designated 21, the tube and its wire support extend into a valve 22 which is located in a correspondingly shaped recess in the mold to receive it thus providing a means at the other end of the core to snugly fit the end of the branch of the mold cavity.

The assembly thus far described will be of a stiff character which can be placed into a cavity of a mold such as shown in FIG. 1, the cavity being designated as 25 and there may be other cavities extending along the mold depending on how many are to be formed at one time. The enlarged portion 11 will be located in the enlarged portion 27 of the cavity 25 and extend therebeyond to rest in a snugly fitting recess 27' in the mold outside the cavity portion 27 as shown at 28 in FIG. 2. The valve 22 with the tube 18 will find support in the branch cavity or mold recess 29. Thus these parts will be suspended or will suspend a large part of the form and core and tube above the cavity formed in the mold so that plastic may flow around it. At the other end of the catheter core, the right angular extending arm 20 will fit in the mold recess 26, while the protuberance 30 from the bottom of the mold shown in FIG. 4 will have a projection 31 to extend into the hold 14 in the form 10, thus supporting this end of the form above the cavity 25. The form and core will be spaced from the end 32 of the cavity. The upper half of the mold will be such as to substantially conform to the lower half of the mold just described with a projection 34 to cover hole 14 so that when closed there will be a good seal between the faces of the mold which abut.

A channel 35 or gate connects with an opening 36 through the top of the mold and with each cavity 25 by conduits 37 and 37'. Thus when the injection molding material is forced under high pressure through the opening 36 and into the gate portion 35 it will extend through each of the conduits 37, 37' and into the cavity 25 and will flow about the form and tube above described providing the plastic as shown at 40 about the tube and about the form 10 thus as shown in cross section in FIG. 2 and FIG. 3 and FIG. 5. As the plastic is forced in, there will be air vented at 45, 45' and 46, 46' from the two branches or arms of the cavity.

In FIG. 7 the construction is similar to that just described except that the tube 18' similar to tube 18 is disposed in a helical fashion about the form 10 which provides the drainage lumen. In other respects this is the same as FIG. 2.

In FIG. 6, however, instead of utilizing a tube for the inflation lumen, a tube 50 is utilized for the drainage lumen, and the form 51 extends through this tube to support the same against collapsing. In this case the form is enlarged as at 52 and joined with the smaller portion 51 as at 53 in a manner similar to the showings of 10, 11 and 12 in connection with FIG. 2. In the case of FIG. 6 a core 55 is connected to the valve 22 which serves as a support in the mold at one end and is offset as at 20' at the other end which provides supports for this core in the mold in a manner similar to that above detailed in connection with the showing in FIG. 2. The form 51 extends out beyond the tube 50 and is in contact with a support similar to 30, 34 so as to support this form in the mold and also to provide an opening for drainage into the drainage lumen formed by the extension of this form 51.

In some cases instead of providing a tube two forms are utilized as shown in FIG. 9, one form 60 being for the provision of the drainage lumen and the other form 61 being provided for the inflation lumen. These are supported in the mold as shown at 30, 31 and described heretofore. The valve 22 will be similar to that utilized shown in FIG. 6. In order to space the two forms 60 and 61, tubes 63 are positioned along the form 61 at spaced intervals and are molded into the body portion of the catheter when it is placed in the mold and the injection molding material is flowed about it. The two forms shown in FIG. 9 will be supported similar to what has been described above.

Inasmuch as the tube 63 provides only a spacing of the two forms 60 and 61 in some cases a flat piece of material 65 may be positioned in between the two forms 60 and 61 as shown in section of FIG. 11 instead of the use of a tube completely encircling the form 61. Otherwise the structure will be the same as FIG. 9.

The material used for injection molding will be a flexible and elastically stretchable material such as silicone rubber. There is, however, a problem presented by the use of silicone rubber in the adhesion of a latex material to form the balloon sac, as I know of no adhesive which will satisfactorily secure these two together. In order to overcome this problem, there is provided a sleeve of polyurethane which acts as a substrate and which may be adhered to the silicone rubber body by means of a silicone adhesive, such as the General Electric Co. product RTV118, and I then use a latex sac which extends over a portion of the polyurethane sleeve and which may be adhered to the polyurethane sleeve by a vinyl latex cement such as the product of United Shoe Machinery Bostik 7130 acting as a tackifier for these two materials.

Figure 14:
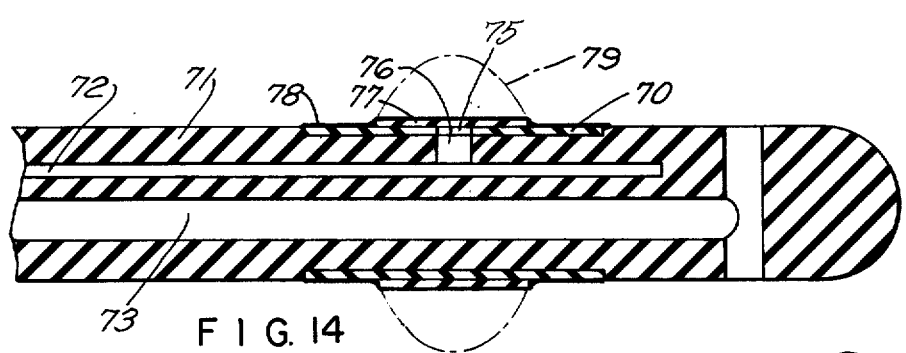
FIG. 14 is a sectional view illustrating one end of the catheter on an enlarged scale and showing the positioning of the sleeve of FIG. 12 and the sac of FIG. 13 in their relationship on the body of the catheter and also showing the securing means between the sleeve and sac.

In FIG. 12 a sleeve 70 is illustrated of tubular form and having an outer diameter substantially the outer diameter of the silicone rubber body shaft designated 71 in FIG. 14 where the inflation lumen is designated 72 and the discharge lumen as 73. The internal diameter 74 of this polurethane sleeve 70 is smaller than the outer diameter of the silicone rubber body shaft 71. This sleeve has an opening 75 formed in it and the silicone rubber shaft is stretched which causes it to become smaller in diameter and while stretched the polyurethane sleeve 70 is positioned over this smaller diameter with its opening 75 registering with the opening 76 in the silicone rubber shaft 71. A silicone adhesive as above set forth is used for securing this polyurethane sleeve to the shaft 71 which becomes a substrate to the silicone rubber shaft.

Figure 13:
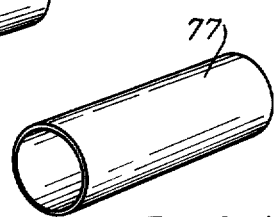
FIG. 13 is a perspective view of the balloon sac.

A latex sac 77 shown by itself in FIG. 13 is then positioned over the polyurethane substrate 70 as shown in FIG. 14 and an adhesive or tackifier for latex and polyurethane such as a vinyl latex cement above set forth is utilized and is shown at 78 to secure this latex sac in position on the polyurethane substrate. This positions the latex sac so that it may be ballooned as shown in dotted lines at 79 to form the balloon of the catheter.

Figure 15:
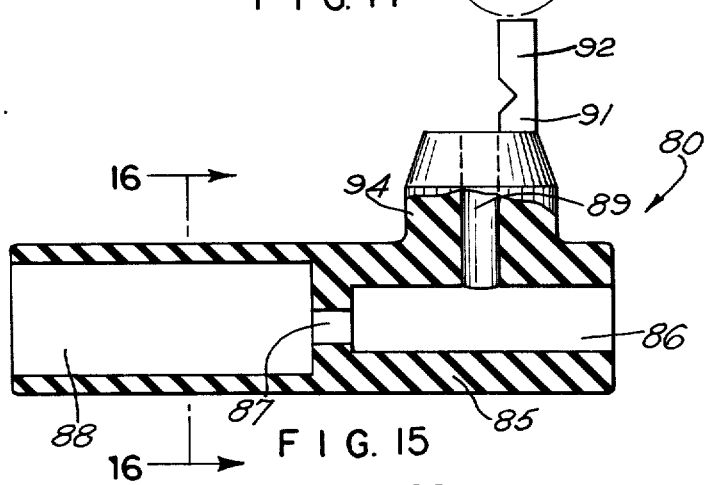
FIG. 15 is a sectional view of a member containing a valve for the inflation lumen to be attached at the discharge end of the catheter.
Figure 16:
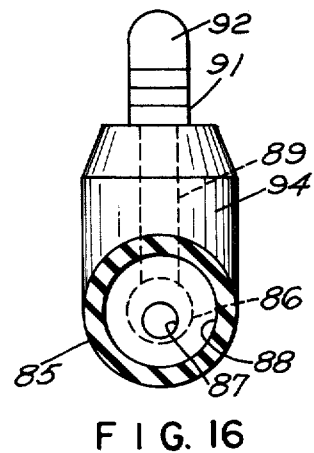
FIG. 16 is a sectional view of the structure shown in FIG. 15.
Figure 17:
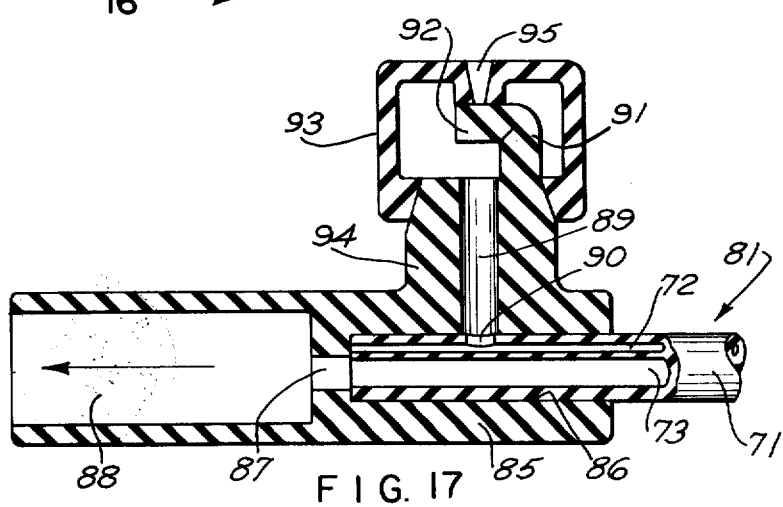
FIG. 17 is a sectional view of a member containing a valve with the discharge end of the catheter attached.
Figure 18:
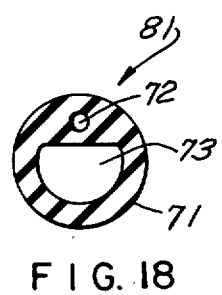
FIG. 18 is a sectional view of the catheter tube showing its two lumens.

In some cases instead of utilizing a valve such as 22 for the end of the inflation lumen I may provide an end member designated generally 80, and shown in section in FIG. 15, for a catheter designated at this discharge end generally 81 and having the same discharge lumen 73 and an inflation lumen 72 heretofore mentioned. This catheter body may be molded in a manner similar to the molding shown in FIGS. 1 to 9 and terminating at substantially the dotdash line shown at 84 in FIG. 2, thus leaving a tube body or shaft 71 or 81 with both lumens terminating at the end thereof the same being substantially uniform throughout its length. In utilizing this sort of shaft for the catheter, an end member 80 (FIG. 15) which may be of polyurethane or silicone rubber has the body 85 provided with a bore 86 which will receive and may have the shaft portion 81 of the catheter secured therein. The body 80 will also have a smaller opening 87 which will be aligned with the discharge opening 73 of the catheter extending in the same axial direction as the opening 86 and extending into the still larger diameter dicharge opening 88. This end member 80 also has a bore 89 at right angles to the bore 86 which will register with an opening 90 communicating with the inflation lumen 72. This end member 80 also has provided angularly extending neck 94 with protruding flexible portion 91 which may be bent over while still under tension to rise as at 92 and which acts as a flapper valve. A cap 93, FIG. 17, is secured over the upstanding neck 94 surrounding the radial opening 89 and this member 93 has an opening 95 which is closed by the angularly extending end 92 of the valve portion just described. Thus when air is inserted through the opening 95 the flapper valve 92 will flex inwardly allowing air to pass through the conduits 89 and inflation lumen 83 to cause the balloon such as indicated at 79 of the latex sac over the silicone rubber body shaft. The air may be allowed to expel by pressing this valve 92 inwardly access to which is through opening 95.

I claim:

1. In the method of forming an inflatable catheter of extended length having two lumens, each extending substantially the length of the catheter, the steps of positioning an extended length form longitudinally of the catheter to provide one of the lumens, positioning a core of an extended length with a lateral arm at its end longitudinally of the catheter in adjacency and spaced from said form so the core and form are generally coextensive, positioning means at intervals between said core and form along their lengths to space the core and form a distance sufficient to provide a wall between them of sufficient thickness to prevent collapsing under inflation pressure of the catheter, providing a mold with a mold cavity of extended length which cavity has an end wall, locating said core and form in spaced relation to said end wall and the longitudinal walls of the cavity and with said lateral arm at one end of said core positioned in a recess in said mold outside said cavity, providing means at the other end of said core to snugly fit the cavity, said form having its end distant from the end wall of the cavity extending outside said cavity, injecting material in a single step into the cavity about the entire length of said core and form to provide a body and also provide between said core and form a wall and then withdrawing said core and form from the molded material to provide two lumens with a wall between them.

2. In the method of claim 1 wherein the means between the core and form to space them is provided by placing a tube about said core.

3. In the method of claim 1 wherein the means between the core and form to space them is provided by placing a tube about said form.

4. The method of claim 2 wherein the tube is helically positioned about said form.

5. The method of claim 1 wherein the means to form one of the lumens is supported in the mold by projections engaging opposite sides of the means to provide openings to the lumen.

* * * * *